US008999168B2

(12) United States Patent
Bhave et al.

(10) Patent No.: US 8,999,168 B2
(45) Date of Patent: Apr. 7, 2015

(54) SUPPORTED LIQUID INORGANIC MEMBRANES FOR NUCLEAR WASTE SEPARATION

(75) Inventors: Ramesh R. Bhave, Knoxville, TN (US); Melanie M. DeBusk, Knoxville, TN (US); Guillermo D. DelCul, Powell, TN (US); Laetitia H. Delmau, Oakridge, TN (US); Chaitanya K. Narula, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 765 days.

(21) Appl. No.: 13/284,174

(22) Filed: Oct. 28, 2011

(65) Prior Publication Data

US 2012/0103900 A1 May 3, 2012

Related U.S. Application Data

(60) Provisional application No. 61/408,054, filed on Oct. 29, 2010.

(51) Int. Cl.

*B01D 39/00* (2006.01)
*B01D 39/14* (2006.01)
*B01D 63/00* (2006.01)
*G21F 9/12* (2006.01)

(52) U.S. Cl.

CPC .................................... *G21F 9/125* (2013.01)

(58) Field of Classification Search

CPC ... B01D 61/38; B01D 2325/022; B01D 17/00
USPC ............... 210/643, 500.25, 500.23, 634, 638, 210/681, 760, 321.6; 423/157.3, 249, 423/658.5, DIG. 14, 122
See application file for complete search history.

(56) References Cited

U.S. PATENT DOCUMENTS 5,098,571 A * 3/1992 Maebashi ................ 210/500.23
5,332,531 A * 7/1994 Horwitz et al. ................. 588/20
5,507,949 A * 4/1996 Ho ................................ 210/490
5,678,242 A * 10/1997 Horwitz et al. ................. 588/20
6,096,217 A * 8/2000 Kilambi et al. ............... 210/638

(Continued)

OTHER PUBLICATIONS

Solvent Extraction, 1990, T.Sekini, S. Kusakabe (on line book). google.com/books?isbn=0444596399 T. Sekine, S. Kusakabe—1992—Preview—More editions . . . Mixed Solvent Extraction—Annular Chromatographic Systems for Felement Separation and Purification J.D. Navratil', A. Murphy and D. Sun Department of Mineral Processing and Extractivk).*

*Primary Examiner* — Ana Fortuna
(74) *Attorney, Agent, or Firm* — Warner Norcross & Judd LLP

(57) ABSTRACT

A system and method for the extraction of americium from radioactive waste solutions. The method includes the transfer of highly oxidized americium from an acidic aqueous feed solution through an immobilized liquid membrane to an organic receiving solvent, for example tributyl phosphate. The immobilized liquid membrane includes porous support and separating layers loaded with tributyl phosphate. The extracted solution is subsequently stripped of americium and recycled at the immobilized liquid membrane as neat tributyl phosphate for the continuous extraction of americium. The sequestered americium can be used as a nuclear fuel, a nuclear fuel component or a radiation source, and the remaining constituent elements in the aqueous feed solution can be stored in glassified waste forms substantially free of americium.

25 Claims, 6 Drawing Sheets

(56) References Cited

U.S. PATENT DOCUMENTS

| | | | | |
|---|---|---|---|---|
| 6,570,343 | B1 * | 5/2003 | Shoji et al. | 315/224 |
| 7,686,865 | B2 * | 3/2010 | Wai et al. | 75/396 |
| 8,167,067 | B2 * | 5/2012 | Peterson et al. | 180/68.2 |
| 2006/0175254 | A1 * | 8/2006 | Bauer | 210/634 |
| 2011/0226694 | A1 * | 9/2011 | Martin et al. | 210/638 |

* cited by examiner

SUPPORTED LIQUID INORGANIC MEMBRANES FOR NUCLEAR WASTE SEPARATION

This application claims the benefit of U.S. Provisional Application No. 61/408,054, filed Oct. 29, 2010, the disclosure of which is hereby incorporated by reference in its entirety.

This invention was made with government support under Contract No. DE-AC05-00OR22725 awarded by the U.S. Department of Energy. The government has certain rights in the invention.

BACKGROUND OF THE INVENTION

The present invention relates to the separation of actinides, including for example americium, from radioactive waste solutions.

A number of nuclear processes generate spent nuclear fuel with high levels of radioactive decay. At present, spent nuclear fuel is stored among reactor sites in approximately 39 different states across the U.S., and largely without recycling or reprocessing. For example, as much as 59,000 tons of spent nuclear fuel are in temporary storage, growing at a rate of 2,300 tons per year. Over the past several decades, however, efforts have been underway to centralize the disposal of current and future spent nuclear fuel into a single repository. To maximize the capacity of a single repository, methods have been proposed to recycle portions of spent nuclear fuel, thereby minimizing the quantity of spent nuclear fuel intended for long term storage.

For example, processes such as Uranium Extraction (UREX) and Plutonium Uranium Recovery by Extraction (PUREX) have been developed to extract uranium and/or plutonium from spent nuclear fuel for use in commercial reactors using liquid-liquid reprocessing techniques. After these extraction processes, however, a number of highly radioactive constituents remain. After UREX reprocessing, for example, the remaining constituents include plutonium (Pu) and several minor actinides, including americium (Am), neptunium (Np) and curium (Cm). Am constitutes approximately 73% of all the minor actinides present after fifty years of storage. In addition, Am-241 generates approximately 75% of the emitted heat after 250 years of storage, while its decay daughter, Np-237, is the principal source of radiotoxicity among the remaining minor actinides.

The amount of spent nuclear fuel that can be stored in any single repository is generally constrained by the amount of decay heat and radiotoxicity generated by the constituent actinides. As the decay heat and radiotoxicity of constituent actinides increase, the spacing between storage units within the repository must also increase. Thus, it is generally desirable to eliminate or severely reduce the presence of actinides, and most significantly Am, from spent nuclear fuel.

Accordingly, there remains a need for an improved system and method for the separation of actinides from spent nuclear fuel. In particular, there remains a need for an improved system and method for the separation of americium from an aqueous waste solution to minimize the heat decay and radiotoxicity of spent nuclear fuel for long term storage solutions.

SUMMARY OF THE INVENTION

Systems and methods for the extraction of americium from radioactive waste solutions are provided. The systems include the transfer of oxidized americium from an aqueous feed through an immobilized liquid membrane to an organic receiving phase. The receiving phase is subsequently stripped of americium and recycled at the immobilized liquid membrane for the continuous extraction of oxidized americium. The remaining constituent elements in the aqueous feed can be processed for long term storage substantially free of americium, and the sequestered americium can be used as a nuclear fuel, a nuclear fuel component or a radiation source.

The immobilized liquid membrane includes a supporting layer and a separating layer. Both layers are generally thin, having relatively high porosity and low tortuosity. The immobilized liquid membrane is optionally cylindrically-shaped, having an inner separating layer and an outer supporting layer. The aqueous feed flows through the cylinder core while the organic receiving phase is directed along the cylinder exterior. An organic immobilized solvent is retained within pores in the inner separating layer and within pores in the outer supporting layer to extract highly oxidized americium from the aqueous feed. The optional single channel, tubular geometry of the supporting and separating layers facilitates the cross-flow extraction of americium across the immobilized liquid membrane.

The aqueous feed can include an acidic solution containing oxidized americium. For example, the aqueous feed can initially include nitric acid containing Am(III). The Am(III) can be oxidized to Am(VI) by bubbling ozone through UREX and/or PUREX waste streams. In some applications the aqueous feed can be pressurized up to and including 14.5 psig, while in other applications the aqueous feed can be pressurized to higher pressures if desired (e.g., 50 psig or higher depending on the pore characteristics). The aqueous feed can be singularly or repeatedly treated at the immobilized liquid membrane before being processed for long-term storage substantially free of americium.

The immobilized solvent and the organic receiving phase include a suitable solvent or solvent mixture adapted to extract oxidized americium. In some embodiments the immobilized solvent and the organic receiving phase include tributyl phosphate, while in other embodiments the immobilized solvent and the organic receiving phase include an N,N-dialkylamide. A high concentration gradient of oxidized americium is maintained across the immobilized liquid membrane to provide for the continuous transfer of americium from the acidic aqueous feed and into the organic receiving phase. This process improves the separation efficiency over existing methods by maximizing the removal of Am(VI) from the acidic aqueous feed while avoiding equilibrium limitations.

In some embodiments, the organic receiving phase is subsequently stripped of americium. For example, the organic receiving phase is stripped of americium in a back-extraction process at a second immobilized liquid membrane. The second immobilized liquid membrane can be in series with the first immobilized liquid membrane, or can be nested around the exterior of the first immobilized liquid membrane. The second immobilized liquid membrane can contain immobilized diluted acid and can be surrounded by a diluted nitric acid receiving solvent. Neat tributyl phosphate can be recirculated to the first immobilized liquid membrane for reuse as an extractant of oxidized americium. Other methods for back-extraction include a mixer/settler containing a weak nitric acid solution and/or a centrifugal contactor containing a weak nitric acid solution. In addition, the supporting layer for the first and second immobilized liquid membranes is optionally formed of stainless steel, and the separating layer for the first and second immobilized liquid membranes is optionally formed of a metal-oxide.

The systems and methods of the present invention employ robust immobilized liquid membranes to facilitate the removal of americium from an aqueous feed under highly acidic and radiolytic conditions, potentially achieving the removal of over 99% of the americium in the aqueous feed. The systems and methods overcome removal limitations caused by equilibrium effects and can be operated using only the solvents employed elsewhere in recycling processes. Additionally, phase mixing of solvents does not occur, eliminating the generation of secondary toxic waste and the potential for emulsion problems. The net result of the removal of americium is the substantial expansion of repository storage capacity. When used in combination with UREX reprocessing, the present invention can potentially remove in excess of 95% of the mass of nuclear waste, significantly reducing close-packing constraints caused by long-term heat generation and radiotoxicity.

These and other features and advantages of the present invention will become apparent from the following description of the invention, when viewed in accordance with the accompanying drawings and appended claims.

DETAILED DESCRIPTION OF THE CURRENT EMBODIMENT

The invention as contemplated and disclosed herein includes systems and methods for the extraction of americium from spent nuclear fuel using an immobilized liquid membrane. As set forth below, the immobilized liquid membrane of the present invention can substantially remove americium from spent nuclear fuel to potentially increase the storage capacity of radioactive waste repositories while also providing a source of americium for nuclear fuel, nuclear fuel components and other applications.

Figure 1:
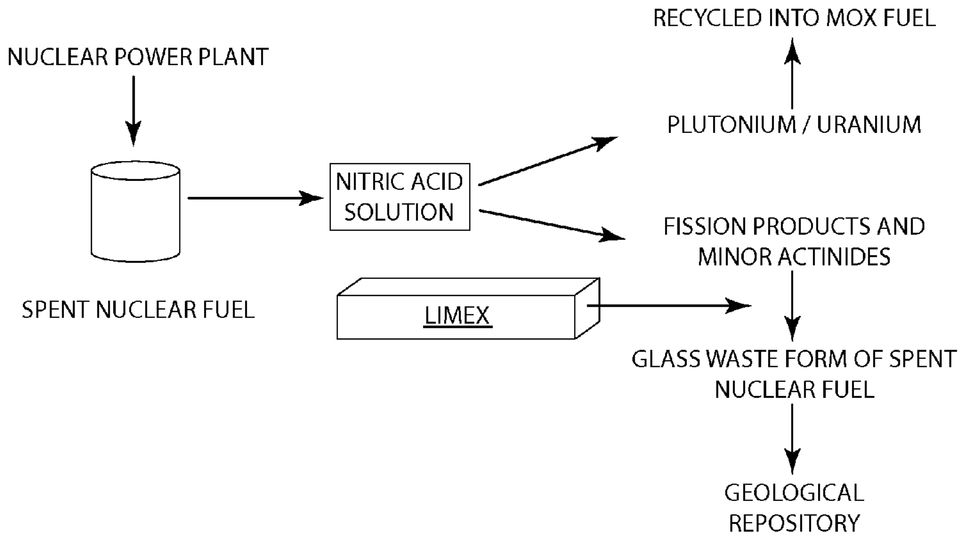
FIG. 1 is a flow diagram of americium extraction in accordance with an embodiment of the invention.
Figure 2:
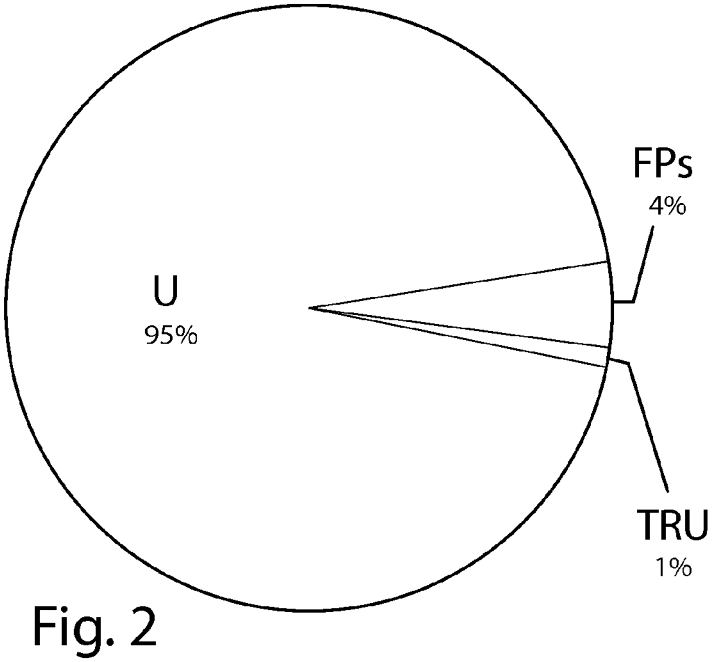
FIG. 2 is a pie chart illustrating the composition of spent nuclear fuel including uranium, transuranic elements and fission products.

FIG. 1 illustrates the sequencing of americium extraction in accordance with the present invention. Spent nuclear fuel initially includes a mixture of high atomic weight elements, e.g., uranium and transuranic elements, and small atomic weight elements, e.g., fission products. For example, the composition of spent nuclear fuel after a fuel utilization of 40 GWd/MT can be 95% uranium as shown in FIG. 2, with the remaining 5% being transuranic elements and fission products. The dissolution of spent nuclear fuel in nitric acid according to known reprocessing techniques can result in the removal of uranium if UREX is utilized and both uranium and plutonium if PUREX is utilized. The sequestered uranium and/or plutonium can then be recycled for subsequent use as mixed uranium-plutonium oxides (MOX).

Figure 3:
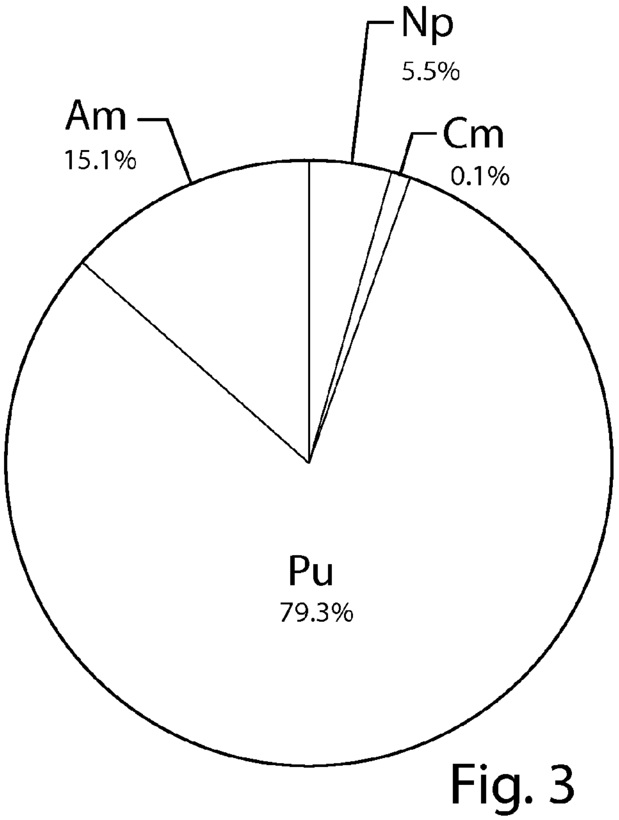
FIG. 3 is a pie chart illustrating the constituent transuranic elements of spent nuclear fuel after fifty years of storage.

After the separation and recovery of uranium and/or plutonium, the remaining spent nuclear fuel includes several constituent transuranic elements and fission products. The constituent transuranic elements typically include approximately 79.3% plutonium, 15.1% americium, 5.5% neptunium and 0.1% curium after UREX reprocessing as generally show in FIG. 3. In addition, the fission products typically include a variety of constituent elements including lanthanides such as cerium (Ce), eg., Ce-141 and Ce-144, having much shorter half-lives. At this stage, the immobilized liquid membrane of the present invention can be utilized to remove potentially over 99% of the americium—and in many instances cerium—from the remaining spent nuclear fuel. Generally, the immobilized liquid membrane facilitates the transfer of americium from an aqueous feed, through an immobilized solvent, and into a sweeping receiving solvent in a continuous Liquid Membrane Extraction (LIMEX) process. The receiving solvent can then be treated in a back-extraction process to strip it of americium before recirculating the receiving solvent. The sequestered americium can be used as a nuclear fuel component, and the remaining transuranic elements in the aqueous feed solution can then be solidified in glassified waste forms for long term storage in a geological repository.

Figure 4:
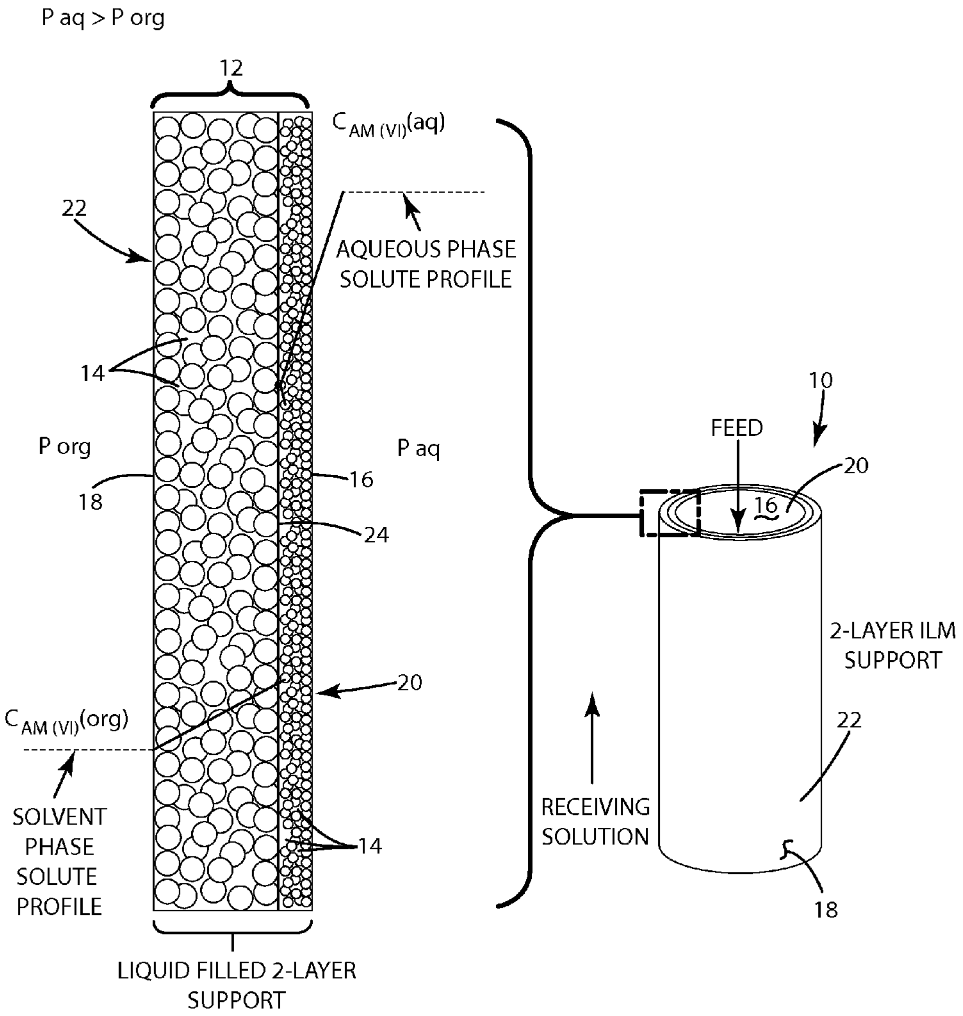
FIG. 4 is a diagram of an immobilized liquid membrane in accordance with the americium extraction process of the present invention.
Figure 5:
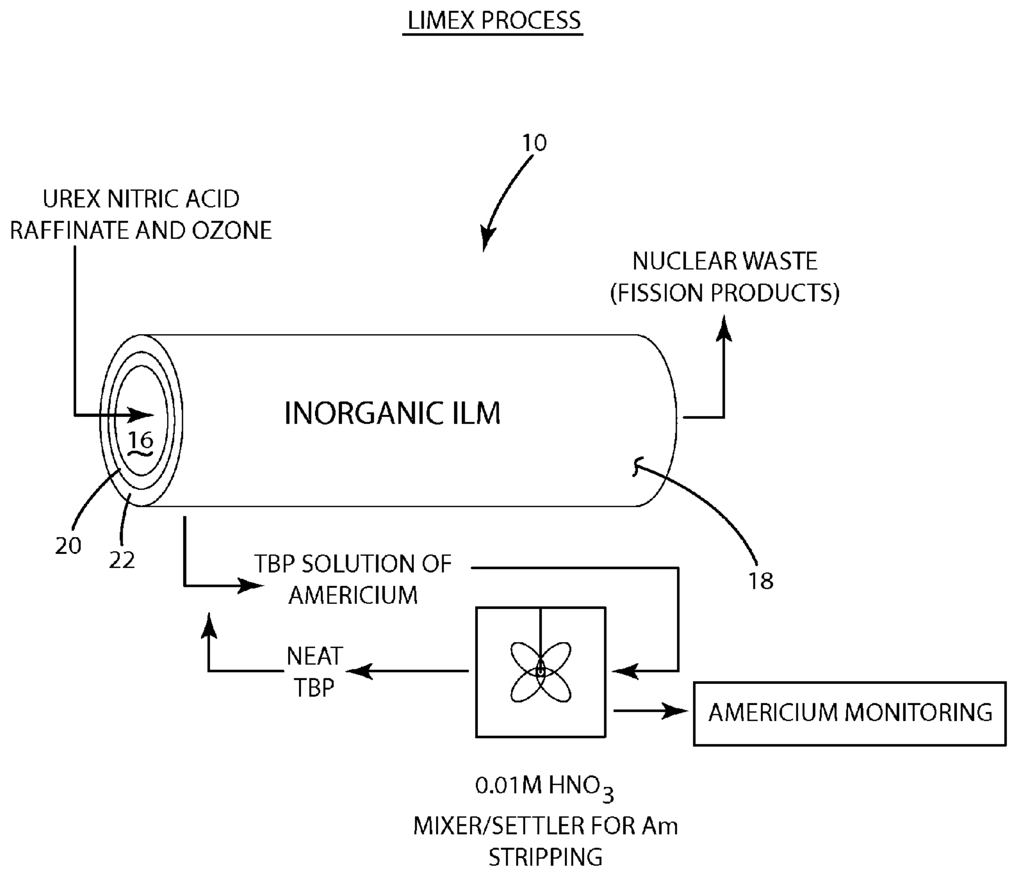
FIG. 5 is a flow diagram of the americium extraction process of the present invention including the back-extraction of americium from tributyl phosphate.

With reference to FIGS. 4-5, an immobilized liquid membrane (ILM) is illustrated and generally designated 10. The ILM 10 includes an inorganic composite structure 12 and an immobilized organic solvent 14 retained therein. The inorganic composite structure 12 is generally thin walled, demonstrating relatively high porosity and low tortuosity, and can assume a variety of suitable geometries. In the tubular configuration as shown in FIG. 4, the composite structure 12 includes an inner separating layer 20 and an outer supporting layer 22. The inner separating layer 20 includes a first major surface 16 disposed generally perpendicular or transverse to a feed flow. The outer supporting layer 22 includes a second major surface 18 spaced apart from the first major surface 16 and disposed generally perpendicular to a receiving flow. The separating layer 20 defines a width less than the width of the supporting layer 22. For example, the separating layer 20 can include a wall thickness in the range of 0.5-50 μm, optionally 1-10 μm, while the supporting layer 22 can include a wall thickness in the range of 400-4000 μm, optionally less than 1000 μm (not shown to scale).

A wide selection of available and suitable materials can ensure long-term chemical stability of the inorganic composite structure 12 under strongly acidic and radiolytic conditions. In particular, the separating and supporting layers 20, 22 are generally selected from inorganic materials adapted to withstand the radiotoxicity of americium and the acidity of the aqueous feed (e.g., 3M $HNO_3$) that would otherwise degrade an organic (e.g., polymeric) membrane. In the present embodiment, the separating layer 20 is formed of a ceramic or metal oxide, for example $Al_2O_3$ or $TiO_2$, while alternative materials may be utilized in other embodiments. In addition, the supporting layer 22 is formed of stainless steel in the present embodiment, while in other embodiments the supporting layer 22 can include other materials (e.g., ceramic oxides or carbides) as desired. In addition, the pore size within the separating layer 20 is generally at least an order of magnitude smaller than the pore size in the supportive layer 22. For example, the metal oxide separating layer 20 can include an average pore size in the range of 2-200 nm, optionally 5-20 nm, while the stainless steel supportive layer 22 can include an average pore size in the range of 0.5-50 μm, optionally 1-10 μm (not shown to scale).

An immobilized organic solvent 14, for example tributyl phosphate (TBP), is supported and retained in pores in the tubular structure 12 by capillary forces and wetting. Typically the immobilized organic solvent 14 is first completely incorporated into both layers 20, 22 of the composite structure 12 through a wetting step. A number of alternative organic solvents can also be utilized. For example, the immobilized solvent can include an N,N-dialkylamide, as well as hydrocarbons and various other mineral spirits that are suitable for use as extractants.

The composite structure 12 is well suited for the cross-flow transfer of oxidized americium (and oxidized cerium i.e. Ce(IV)) due at least in part to its optionally thin and uniform cross-section having relatively high permeability, narrow pore size distribution, as well as a high porosity and low tortuosity. As generally depicted in FIG. 4, the separating and supporting layers 20, 22 can include a uniform grain structure composed of spherical particles. The separating layer 20 can optionally be formed separately from supporting layer 22 and integrally bonded to the supporting layer 22 according to any suitable means. For example, the separating layer 20 can be deposited on the inner and/or outer surface of the supporting layer 22 according to conventional sol-gel, slurry or wash coating techniques. The composite structure 12 can include an additional sub-layer(s) if desired, including for example an additional sub-layer(s) adhered to or between the separating or supporting layers 20, 22.

In operation, Am(III) is oxidized to Am(VI) by bubbling ozone through an acidic aqueous feed. Unlike cerium and most of the trivalent fission products, Am(III) can be oxidized to its higher oxidation state to facilitate extraction. The oxidized feed flow is directed through the core of the composite structure 12, and a receiving flow including an organic receiving phase is directed along the exterior of the composite structure 12. TBP contained within the separating layer 20 extracts Am(VI) solutes from the aqueous feed. Am(VI) is then transferred into the supporting layer 22 at the interface 24 between the separating and supporting layers 20, 22. The concentration of Am(VI) in the separating and supporting layers 20, 22 declines as one moves radially outward from the first major surface 16 toward the second major surface 18. In addition, there is a change in the concentration gradient across the tubular structure 12 at the interface 24.

The extraction or transfer of Am(VI) from the separating layer 20 and into the supporting layer 22 is followed by the continued transfer of Am(VI) into the sweeping receiving flow. The receiving flow includes neat TBP in the present embodiment, becoming a TBP solution of americium as shown in FIG. 5. While the feed and receiving flows are shown as being in opposite directions (i.e., counter-current) in FIG. 4, it should be noted that the feed and receiving flows can be in the same direction (i.e., co-current) or transverse directions (i.e., cross-current), for example. It should also be noted that a spontaneous reduction of unstable Am(VI) to Am(III) occurs throughout this extraction, such that a portion of the americium in the TBP solution of americium is Am(III), reduced from Am(VI). Am(III) can be readily separated from the TBP solution of americium by coming into contact with an aqueous phase. Alternatively, Am(VI) can be extracted from the TBP solution of americium according to the back extraction processes noted below.

As also shown in FIG. 5, the TBP solution of americium, or Am-TBP solution, is subsequently stripped of americium in a back-extraction process before recirculating neat TBP to the supporting layer 22. The back-extraction process can include: (i) a mixer/settler containing a weak nitric acid solution to strip Am from the Am-TBP solution; (ii) a centrifugal contactor containing a weak nitric acid solution to strip Am from the Am-TBP solution; and/or (iii) an acidic ILM to strip Am from the Am-TBP solution. The weak nitric acid solution can include 0.01M $HNO_3$. The regenerated neat TBP can be recirculated as the receiving phase to maintain a high concentration gradient across the tubular structure 12. That is, the cross-flow operation of the ILM 10 allows both the feed and receiving solutions to flow parallel to the tubular structure 12 which creates two exit streams. The feed solution can be recirculated through the core of the tubular support 12 as extracted solutes pass through the ILM 10 into a sweeping receiving phase on the exterior of the tubular support 12. This configuration minimizes overall membrane resistance which helps increase the mass transfer rate by maintaining a relatively high concentration gradient across the ILM 10. In addition, quantities of Ce(IV) that transfer with Am(VI) have a much shorter half-life (e.g., 32.5 days for Ce-141 and 285 days for Ce-144 as compared to 432.2 years for Am-241). As a result, additional separation or processing of cerium, while possible, is in many instances rendered unnecessary or undesirable.

The above steps can occur rapidly in series, providing high flux and selectivity. Because TBP extracts oxidation states IV and VI and does not extract oxidation state III, Am(VI) is extracted into the TBP-filled inorganic separating and supporting layers 20, 22. With a sufficient driving force or concentration gradient generated from the americium-stripped receiving solvent, Am(VI) continues to be extracted into the TBP receiving phase through the thin and selective ILM.

While depicted as being cylindrical in FIGS. 4-5, the composite structure 12 can include any other configuration as desired. For example, the composite structure 12 can be hollow fiber, honeycomb, multichannel monolith, flat disk, sheet-like or any other shape as desired. The composite structure 12 can further include a coating deposited on either side thereof, including for example the separating layer 22, to increase the working pressure of the supported liquid membrane 10 and/or to maintain the operating function of the ILM 10. Such a coating can include a hydrophobic coating on the separating layer 16 to prevent the emulsion of TBP into the aqueous feed, and more particularly a fluorocarbon coating, such as FC-721 by the 3M Company of St. Paul, Minn. In addition, a tubular composite structure 12 can optionally include an inner supporting layer 22 and an outer separating layer 20. In this configuration, the feed flow is directed along the exterior of the composite structure 12 and the receiving flow is directed through the core of the composite structure 12.

Figure 6:
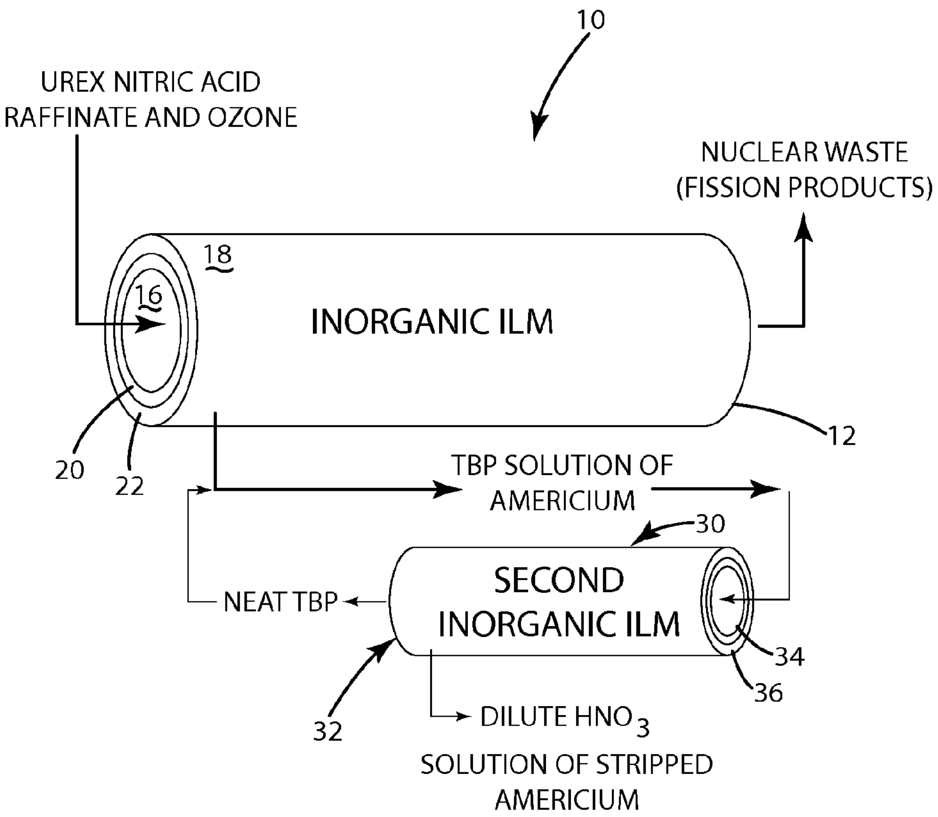
FIG. 6 is a flow diagram of the americium extraction process of the present invention including a second immobilized liquid membrane.

As noted above, the receiving flow can be stripped of americium as part of a continuous process. Referring now to FIG. 6, for example, the system and method of the present invention include an optional second ILM 30 disposed in series with the first ILM 10. The second ILM 30 includes a tubular composite structure 32 including an inner separating layer 34 and an outer supporting layer 36 substantially as set forth above in connection with FIGS. 4-5. The receiving flow for the first ILM 10 constitutes the feed flow for the second ILM 30. That is, the TBP solution of americium from the first ILM 10 is directed through the core of the second ILM 30 as generally depicted in FIG. 6. The receiving flow for the second ILM 30 includes a dilute acidic extracting solvent, e.g, 0.01M $HNO_3$, a portion of which is retained within pores of the separating and supporting layers 32, 34. The second ILM 30 facilitates the extraction of americium from the TBP solution of americium through the immobilized extracting solvent, and into a dilute nitric acid receiving phase. The resulting neat TBP solvent is then recirculated to the first ILM 10 for reuse as the receiving flow along the exterior of the supporting layer 22.

Figure 7:
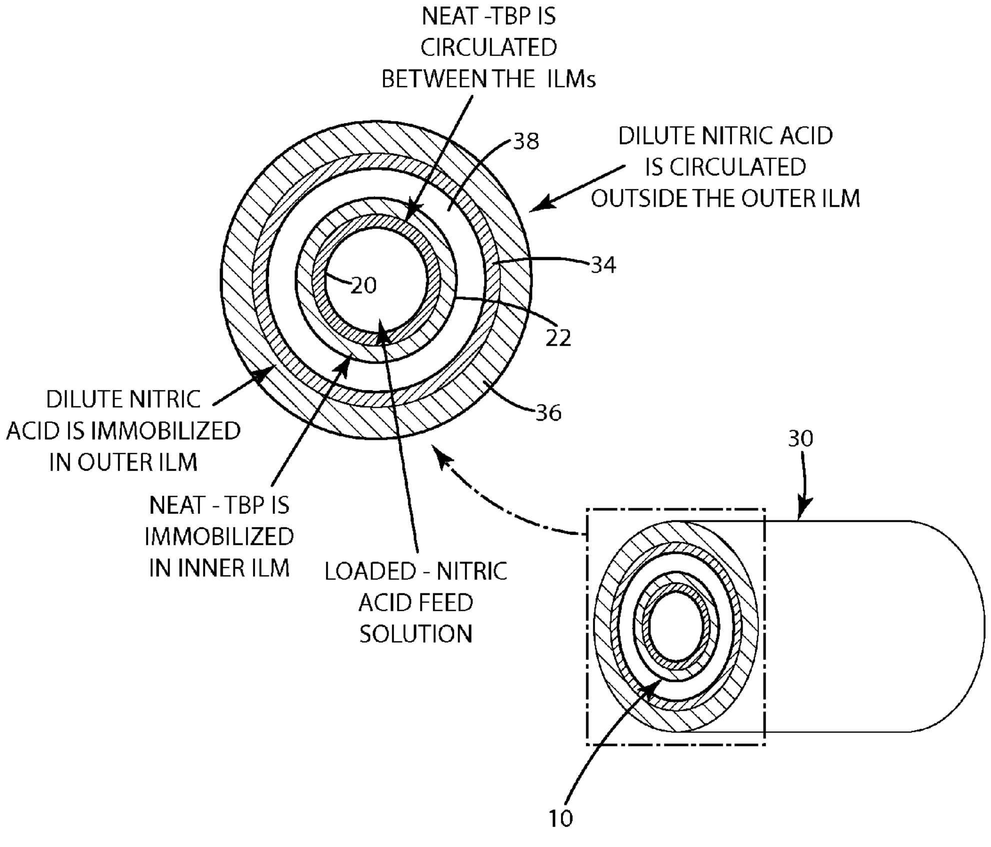
FIG. 7 is a flow diagram of the americium extraction process of the present invention including nested immobilized liquid membranes.

As optionally depicted in FIG. 7, the second ILM 30 is concentric with and spaced apart from the first ILM 10 in a nested configuration. A strongly acidic feed solution containing oxidized americium is directed through the core of the first ILM 10, a neat TBP receiving flow is directed through the annulus 38 between the ILMs, and a dilute acid stripping solution is directed along the exterior of the second ILM 30. The first ILM 10 is filled with an immobilized TBP solvent, and the second ILM 30 is filled with an immobilized $HNO_3$ solvent. The feed flow, receiving flow, and extracting flow can be co-current or counter-current. In operation, the outer ILM 30 strips americium from the TBP receiving phase being circulated between ILMs. Recirculation of neat TBP to the region between ILMs is optionally continuous to maintain a neat TBP solvent in the annulus 38. An optional hydrophobic coating can be deposited on the second ILM 30 separating layer 34 and subsequently filled with TBP.

The ILM of the present invention can be operated with or without a pressure differential across the composite structure 12. For example, the feed flow can be at a higher pressure than the receiving phase. In other embodiments, the feed flow and the receiving phase do not include a pressure differential. Generally, the capillary actions that retain the immobilized solvent (e.g. TBP) within the composite structure 12 should be sufficiently strong to withstand a pressure differential across the composite structure. More specifically, the capillary actions prevent the aqueous feed solution from permeating through the composite structure 12 at pressures at least 15-20 psi below the displacement pressure or bubble point pressure (i.e., the pressure at which the organic solvent can not be maintained integrally within the pores in the composite structure) for the system. The displacement pressure is related to the properties of the composite structure 12 (pore size, surface properties such as contact angle) and surface tension at the liquid-liquid interface. For example, membranes with a lower pore diameter (<0.5 μm) show relatively high bubble point pressures (>20 psig), which is desirable for the ILM.

In addition, the feed solution can be any americium-loaded aqueous solution. For example, the feed solution can include a 3M nitric acid solution from uranium or plutonium separation processes such as UREX, PUREX and TRUEX. Americium in the feed solution is initially oxidized to the +6 oxidation state according to any suitable method, including ozonation for example. The feed solution can also be pressurized as noted above. Pressures up to and including 14.5 psig have been tested, and the ILMs are expected to be capable of maintaining integrity at higher pressures, including for example up to and including 30 psig, 40 psig and/or 50 psig depending on the size of the separative layer.

Because TBP is also used in UREX extraction processes, the TBP receiving solvent does not introduce additional solvents into the industrial process. Additionally, since phase mixing does not occur, the extraction process eliminates the generation of secondary waste and the potential for emulsion problems. The immobilized solvent can also be different from the receiving phase. For example, the immobilized solvent can include TBP, while the receiving phase includes N,N-dialkylamide or other suitable extractants.

Americium sequestered by the system and method noted above can be of a sufficient quality for use as a nuclear fuel, a nuclear fuel component, or as a radioactive source. The separation of americium according to the present invention is superior over other methods by eliminating equilibrium limitations and reducing waste streams. The removal of americium can potentially eliminate close-packing constraints caused by the large amount of heat produced by americium. Thus, spent nuclear fuel can be stored in much smaller spaces, lessening the need to find new storage solutions.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method for the extraction of americium comprising:

providing a first immobilized liquid membrane including a metal oxide separating layer, a supporting layer formed of a separate material than the separating layer, and an immobilized solvent retained in the separating and supporting layers, the separating layer defining a core, the supporting layer extending around the separating layer;

directing an aqueous feed solution containing Am(VI) through the core and along a surface of the separating layer distal from the supporting layer; and directing a receiving solvent along a surface of the supporting layer distal from the separating layer to transfer Am(VI) from the aqueous feed solution, through the immobilized solvent, and into the receiving solvent.

2. The method of claim 1 including introducing ozone in the aqueous feed solution to oxidize Am(III) to Am(VI).

3. The method according to claim 1 further including recirculating the aqueous feed solution along the separating layer.

4. The method of claim 1 wherein the immobilized solvent and the receiving solvent include tributyl phosphate.

5. The method according to claim 1 further including extracting Am(VI) from the receiving solvent and recycling the receiving solvent at the first immobilized liquid membrane.

6. The method of claim 5 wherein the extracting step includes treating the receiving solvent at a second immobilized liquid membrane containing an immobilized dilute acid solvent.

7. The method of claim 6 wherein the first and second immobilized liquid membranes are cylindrical, the first immobilized liquid membrane being concentric with and spaced apart from the second immobilized liquid membrane.

8. The method of claim 1 including pressuring the aqueous feed solution to between approximately 0 psig and approximately 50 psig.

9. The method of claim 1 further including maintaining a concentration gradient of Am(VI) across the first immobilized liquid membrane.

10. An immobilized liquid membrane comprising:

a metal oxide separating layer adjacent a feed flow containing Am(VI), the separating layer defining a cylindrical core to receive the feed flow; and a supporting layer extending around the separating layer and being adjacent a receiving flow, the supporting layer formed of a separate material than the separating layer, wherein the separating and supporting layers retain an immobilized solvent adapted to extract Am(VI) from the feed flow for transfer to the receiving flow.

11. The immobilized liquid membrane of claim 10 wherein the immobilized solvent includes tributyl phosphate.

12. The immobilized liquid membrane of claim 10 wherein separative and supporting layers are cylindrically shaped.

13. The immobilized liquid membrane of claim 10 wherein the separating layer includes a thickness of between approximately 0.5-50 μm and an average pore size of between approximately 2-200 nm.

14. The immobilized liquid membrane of claim 10 wherein the supporting layer includes a thickness of between approximately 400-4000 μm and an average pore size of between approximately 0.5-50 μm.

15. A system for the extraction of americium from spent nuclear fuel comprising:

a feed flow containing oxidized americium;

a receiving flow containing an organic receiving solvent; and an immobilized liquid metal oxide membrane including a metal oxide separating layer, a supporting layer, and an interface therebetween, the separating layer defining a core that includes a major surface, the supporting layer extending around the separating layer and including a major surface, wherein the separating layer and the supporting layer retain the organic receiving solvent therein, wherein the direction of the feed flow is parallel to the major surface of the separating layer, and wherein the direction of the receiving flow is parallel to the major surface of the supporting layer.

16. The system of claim 15 wherein the immobilized liquid membrane defines a decreasing concentration gradient of oxidized americium from the feed flow to the receiving flow.

17. The system of claim 15 wherein the separating and supportive layers define a cylinder.

18. The system of claim 17 wherein the feed flow is directed through a core of the cylinder defined by the separative and supporting layers.

19. The system of claim 17 wherein the receiving flow is directed along the exterior of the cylinder defined by the separative and supporting layers.

20. The system of claim 15 wherein the separating layer defines an average pore size less than the average pore size of the supportive layer.

21. A method comprising:

providing an metal oxide membrane including an immobilized solvent retained therein, the inorganic membrane including a metal oxide separating layer defining a core, a supporting layer extending around the separating layer, and an interface between the separating layer and the supporting layer; and applying a concentration gradient of oxidized americium across the inorganic membrane to transfer americium from a feed flow to a receiving flow, the feed flow and the receiving flow being in a direction generally parallel to the separating layer and the supporting layer, respectively.

22. The method of claim 21 wherein the immobilized solvent is operable to extract oxidized americium solutes from an aqueous feed solution.

23. The method of claim 21 wherein the applying step includes directing the feed flow along a first major surface of the inorganic membrane and directing the receiving flow along a second major surface of the inorganic membrane.

24. The method of claim 21 including applying a pressure differential across the inorganic membrane.

25. The method of claim 21 including providing a hydrophobic layer on a surface of the inorganic membrane.

* * * * *